G. SELDEN.

Register.

No. 98,111.

Patented Dec. 21, 1869.

Witnesses:
Geo. D. Selden.
O. C. Briggs.

Inventor:
Geo. Selden

United States Patent Office.

GEORGE SELDEN, OF ERIE, PENNSYLVANIA.

Letters Patent No. 98,111, dated December 21, 1869.

IMPROVEMENT IN INDICATOR FOR SAW-MILL HEAD-BLOCKS.

The Schedule referred to in these Letters Patent and making part of the same

*To all whom it may concern:*

Be it known that I, GEORGE SELDEN, of Erie, in the county of Erie, and State of Pennsylvania, have invented a new and improved Indicator for Saw-Mill Head-Blocks.

The nature of my invention consists in providing an indicator, to be attached to the gearing of saw-mill head-blocks, by which the operator can, at any time, tell, without measuring or arithmetical calculation, how much timber he has left in the log being sawed, and how much stuff of a certain thickness he can produce from the remaining portion of the log.

My invention consists of a dial, revolving, by the action of the head-block gearing, in a circular rim, and under a fixed index, or *vice versa*.

In the accompanying drawings—

The description of my invention is as follows:

A is a brass dial.

B is a rim, in which the dial fits.

N is a plate, on which the dial is secured.

C is an index-bar, which passes along the diameter of the rim B, and is secured to it by the screws P P.

D is a frame, which is collared on to the shaft Y, which is the main shaft of the gearing of the head-blocks.

The dial, rim, &c., are secured to the frame D by the screw K.

The rim B, by being secured to the index-bar C, is held stationary by the screw K; but the dial is movable around the pivot F, and within the rim B.

Figure 2:
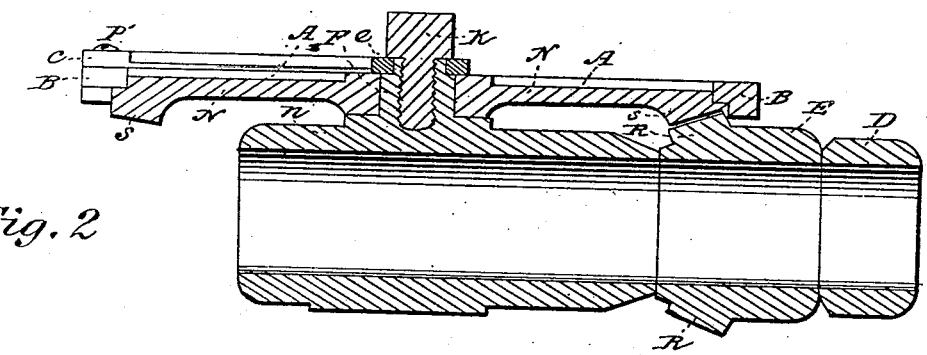
Figure 2 is a sectional view of the same.

The plate N, on its under side, is a bevel-gear, and gears with the pinion E, at R S, fig. 2.

Figure 1:
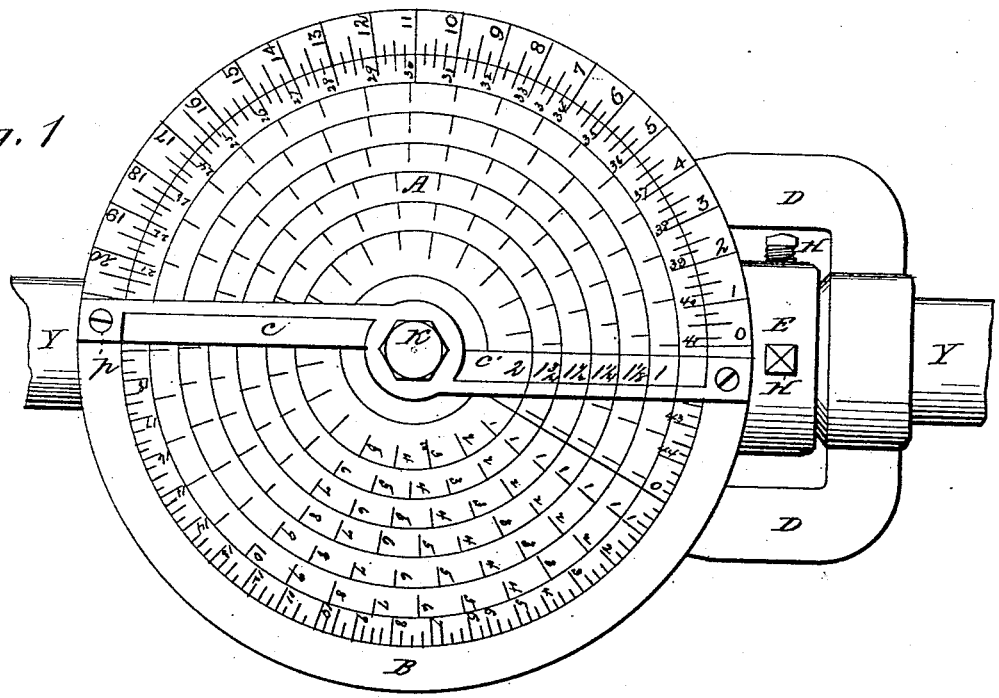
Figure 1 shows a top or face view of my indicator.

The pinion E is secured to the shaft Y by the set-screws H H, fig. 1.

Now, when the shaft Y revolves, the plate N and the dial A, being secured to it, are made to revolve around the pivot F, and in the rim B; and, as the number of cogs on the plate N is the product of the number of cogs on the pinion E multiplied by the number of revolutions the shaft Y is required to make to carry the knees of the head-blocks one tour, it will be seen that the dial will make just one revolution to every tour of the knees. Hence, if the circumference of the dial A is divided into as many spaces as the knees, when drawn back, are inches from the saw, and those spaces numbered, and the index is set at O, when the knees are drawn back, the dial must, at any time, show, at the index-bar on the outer circle, how far the knees are from the saw.

The dial, it will be seen, is laid out in concentric circles, and the outer circle, as before stated, is divided into as many spaces as the knees move inches.

The other circles are graduated for different thicknesses of boards and plank up to two inch plank, and an allowance made for saw-kerf; and the thickness of board or plank calculated on each circle is marked on the index-bar C.

The rim B is also graduated the same as the outer circle of the dial, and the point O is placed one saw-kerf from the index-bar C.

Now, if it is desired to saw stuff exceeding two inches in thickness, as, for example, four inches in thickness, the operator will find figure 4 on the rim B, and will see what figure on the outer circle of the dial coincides. (In the drawings, it is 37.) He then moves the knees until the dial shows the figures 37 at the index-bar. That indicates that the knees, and, of course, the log, have moved four inches and one saw-kerf toward the saw-line, for 4 on the rim B is four spaces and one saw-kerf space from the index-bar C, and each space represents an inch.

What I claim as my invention, is as follows:

1. The dial A, graduated, so as to indicate the several thicknesses of lumber which may be sawed from a log, with an allowance made for saw-kerf, as described, when used in connection with saw-mill head-blocks.

2. The rim B and index-bar C, in combination with the dial A, when constructed and operated in connection with a saw-mill head-block, for the purposes set forth.

3. The shaft Y, pinion E, and frame D, in combination with the plate N, dial A, rim B, and index-bar C, all constructed and operated as and for the purposes set forth.

GEO. SELDEN.

Witnesses:
O. C. BRIGGS,
JNO. K. HALLOCK.